(12) United States Patent
Sharp et al.

(10) Patent No.: US 6,284,530 B1
(45) Date of Patent: Sep. 4, 2001

(54) SULFIDE MINERAL CONCENTRATE BIOLEACHING

(75) Inventors: James E. Sharp; Kevin L. Stuffle; Kelly L. Karlage; Tom L. Young, all of Tucson, AZ (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/510,448

(22) Filed: Feb. 22, 2000

Related U.S. Application Data

(62) Division of application No. 09/079,493, filed on May 15, 1998, now Pat. No. 6,063,158.
(60) Provisional application No. 60/046,639, filed on May 16, 1997.

(51) Int. Cl.[7] ....................................................... C12M 1/00
(52) U.S. Cl. ..................................... 435/294.1; 435/299.1; 435/854
(58) Field of Search ................................. 435/262, 289.1, 435/294.1, 297.1, 299.1, 854; 422/142, 191, 197, 216, 238, 239; 75/743; 423/DIG. 17

(56) References Cited

U.S. PATENT DOCUMENTS

| | | | |
|---|---|---|---|
| 3,856,913 | 12/1974 | McElroy et al. | 423/27 |
| 4,293,333 | * 10/1981 | Drobot | 75/101 BE |
| 5,007,620 | * 4/1991 | Emmett, Jr. et al. | 266/168 |
| 5,332,559 | 7/1994 | Brierley et al. | 423/27 |
| 5,413,624 | * 5/1995 | Rusin et al. | 75/711 |
| 5,672,194 | * 9/1997 | Hunter et al. | 75/712 |
| 6,159,726 | * 12/2000 | Kohr | 435/262 |

FOREIGN PATENT DOCUMENTS

| | | | |
|---|---|---|---|
| 2186202 | 3/1998 | (CA) . | |
| 2225256 | 5/1990 | (GB) | B01J/8/08 |
| 55-162490 | 12/1980 | (JP) . | |
| 8905688 | 6/1989 | (WO) | B01D/53/20 |

OTHER PUBLICATIONS

Wan, R.V., J.D. Miller, J. Foley, Stanley Pons (1984) Office of Naval Research, Fed Rpt. No. 36.

* cited by examiner

Primary Examiner—David A. Redding
(74) Attorney, Agent, or Firm—Saliwanchik, Lloyd & Saliwanchik

(57) ABSTRACT

The subject invention provides a novel process and bioreactor for enhancing the bioleaching of metals from sulfide mineral concentrations.

9 Claims, 6 Drawing Sheets

SULFIDE MINERAL CONCENTRATE BIOLEACHING

CROSS-REFERENCE TO A RELATED APPLICATION

This application is a divional application of U.S. Ser. No. 091079,493, filed May 15, 1998; now U.S. Pat. No. 6,063,158 which claims priority to U.S. Provisional Application No. 60/046,639, filed May 16, 1997.

BACKGROUND OF THE INVENTION

Bioleaching of sulfide ores has been employed for many years in the extractive metallurgy industry. Successful bioleaching requires a thorough understanding of biological regimes and the role of each interrelating element therein. Enhancement of a bioleaching system requires not only a thorough knowledge of the interactive leaching elements, but also knowledge of tolerances for adjustments of those elements to effect the desired results. The goal of these processes is metal release or solubilization in an economically timely manner and concentration. Winning of the solubilizedmetal from a leach solution typically utilizes known extraction concentrationtechnology such as Ion Exchange (IX) or Solvent Extraction (SX). Leach solutions thus concentrated are made amenable to standard precipitation technology such as crystallizers and/or electrowiming (EW) production of metal cathodes.

Some common bioleaching reactants in a sulfide leach system are: acidophilic *Thiobacillusferrooxidans* and/or *Thiobacillus thiooxidans*; bacterial nutrients such as Med 64, Med 125, and PEGM, as disclosed in U.S. Pat. No. 5,413,624; oxygen (air) and carbon dioxide; oxidizers such as ferric sulfate, ferric chloride and ferric methane sulfonate; acids such as sulfuric acid and hydrochloric acid; and reaction catalysts such as silver and carbonaceous materials including, but not limited to, graphite, natural or synthetic, activated carbon or petroleum coke. Temperature is interactive to the bioleaching system, either ambient or elevated by devices.

The chemistry of the bioleaching system is complicated by the proper or improper management of the stated reactants. Two sets of reactions caused by an enhancement of a particular reactant are as follows: oxygen enriched leaching of chalcopyrite ($CuFeS_2$) in the presence of a catalytic amount of silver as shown in U.S. Pat. No. 3,856,913, as illustrated by the reactions $$12CuFeS_2+51O_2+22H_2O \rightarrow 12CuSO_4+4H_3OFe_3(SO_4)_2(OH)_6+4H_2SO_4 \quad (1)$$

and if pyrite (FeS2) is present with the chalcopyrite:

$$12FeS_2+45O_2+34H_2O \rightarrow 4H_3OFe_3(SO_4)_2(OH)_6+16H_2SO_4 \quad (2)$$

Both reactions generate sulfuric acid ($H_2SO_4$) which can lower the pH of the reacted solutions to an intolerable level for acidophilic bacteria which might have been present in the reactants, thus suppressing the contributions which might have been derived from the bacteria.

Conventional chalcocite ($Cu_2S$) and covellite (CuS) bioleaching reactions, which are enhanced only by the presence of a catalyzing inoculum, are as follows:

(T.f.) BAC $$Cu_2S+Fe_2(SO_4)_3 \rightarrow CuS+CuSO_4+2FeSO_4 \quad (1)$$

(T.t.) BAC $$CuS+Fe_2(SO_4)_3 \rightarrow CuSO_4+2FeSO_4+S^o \quad (2)$$

where *Thiobacillus ferrooxidans* serve to reoxidize the reduced ferrous sulfate ($FeSO_4$) to ferric sulfate ($Fe_2(SO_4)_3$), while the Thiobacillus thiooxidans catalyze the continued solubilization of the reaction (1) product covellite (CuS).

A negative reaction product of chalcocite/covellite bioleaching is elemental sulfur (Reaction 2). The negative effect of sulfur is that it forms an amorphous layer over the remaining (non-leached) covellite (Wan, R. V. et al. [1984] "Electrochemical Features of the Ferric Sulfate Leaching of $CuFeS_2$/C Aggregates," Office of Naval Research, Fed. Rpt. No. 36). This amorphous layer is impenetrableto the catalyzing T. thiooxidans, which limits or eliminates further solubilization reactions.

The above stated reactions illustrate only two of the numerous leach conditions which must be understood and properly managed to effect a predictable and desirable result. Further concerns of leach management are materials handling of the leach components, both solid and liquids, such as sulfide mineral concentrate solids and sulfuric acid and/or acidified ferric sulfate liquid reactants.

The bulk solids fed to a particular reaction process must meet the economic constraints of the selected system. Low grade (low metal content) sulfide ores are typically bioleached in dumps or lined heap piles, whereas low grade sulfide concentrates must be processed in low cost reaction vessels, such as passive vat leach tanks or, for higher grades, stir tanks or fluidized reaction vessels. Processing variables which further affect materials handling and processing costs are material feed size, whole ore or milled ore, metal content, solids retention time in reaction vessel (reaction rates), solid to liquid ratios, ie., slurry viscosities or pulp densities; and feed density, amenability of solids suspension (passive, stirring).

Recovery of metals from sulfide ores is often performed by first producing metal sulfide concentrates through flotation processes. Traditionally,the concentrates are smelted to drive off the sulfur and produce the metal. However, smelting is becoming environmentally unacceptable due to emissions of sulfur dioxide, and the quality of metals produced directly by smelting is inferior to that produced by leaching, solvent extraction, and electrowinning. Hence, there has been interest in processing concentrates by leaching, solvent extraction, and electrowinning.

Processes for refining of concentrates to the metal must meet economic constraints imposed by the marketplace. Stirred tank leaching of concentrates has several drawbacks, typically making it economically unviable. First, many concentrates are refractory to solubilization and require long residence times. Second, high power consumption is required for suspending and mixing of concentrates. In certain instances, stirred tank leaching of concentrates is performed under aggressive conditions using concentrated reagents and heating for higher value metals, but not for the base metals, such as copper and lead. Heap leaching of concentrates has also been investigated. However, processes for heap leaching of concentrates have encountered fluid flow problems such as channeling, ponding, and bypassing due to their fine particle size.

In areas of the world where there are few to no smelters, generally Western Europe, Africa, and parts of Asia, sulfuric acid is produced by burning sulfur. The plant needed to do this is capital-intensive. Operating costs are not much of a consideration due to the co-generation of electricity during the burning of sulfur which offsets the operating costs. A biological method to produce sulfuric acid solution from sulfur would be far less capital-intensive.

BRIEF SUMMARY OF THE INVENTION

The subject invention pertains to processes for extraction of metals from sulfide mineral concentrates and for production of leaching reagents. In one embodiment, the processes of the subject invention utilize a substrate having a high external surface area. In a specific embodiment, this substrate is a ring and pin polyethylene packing, termed "BIOBALLS," to which the concentrates can be bound. The packing provides high external surface area per unit volume over which the concentrates can be thinly coated. The high density of the packing allows high pulp densities to be achieved while leaving a large pore space, which provides relatively uninhibited flow of leach process solutions.

In another embodiment, sulfur is thinly coated over substrates and bioleached to produce sulfuric acid, which can then be used as a reagent in metal leaching. In a specific embodiment, the bioleachingcan be performed using *Thiobacillus thiooxidans*. The benefits of coating the sulfur onto "BIOBALLS" are the same as for the ores or concentrate, i.e., high exposed surface area and uninhibited flow of process solutions.

Packings can be used to mitigate the fluid flow problems encountered when heap leaching concentrates. Although crushed aggregate and crushed glass are examples of the packings that can be used, "BIOBALLS" offer much higher areal densities and leave more open space volume for fluid flow. Twenty percent pulp densities (w/w) are readily obtained with concentrates on "BIOBALLS."

DETAILED DISCLOSURE OF THE INVENTION

Figure 1:
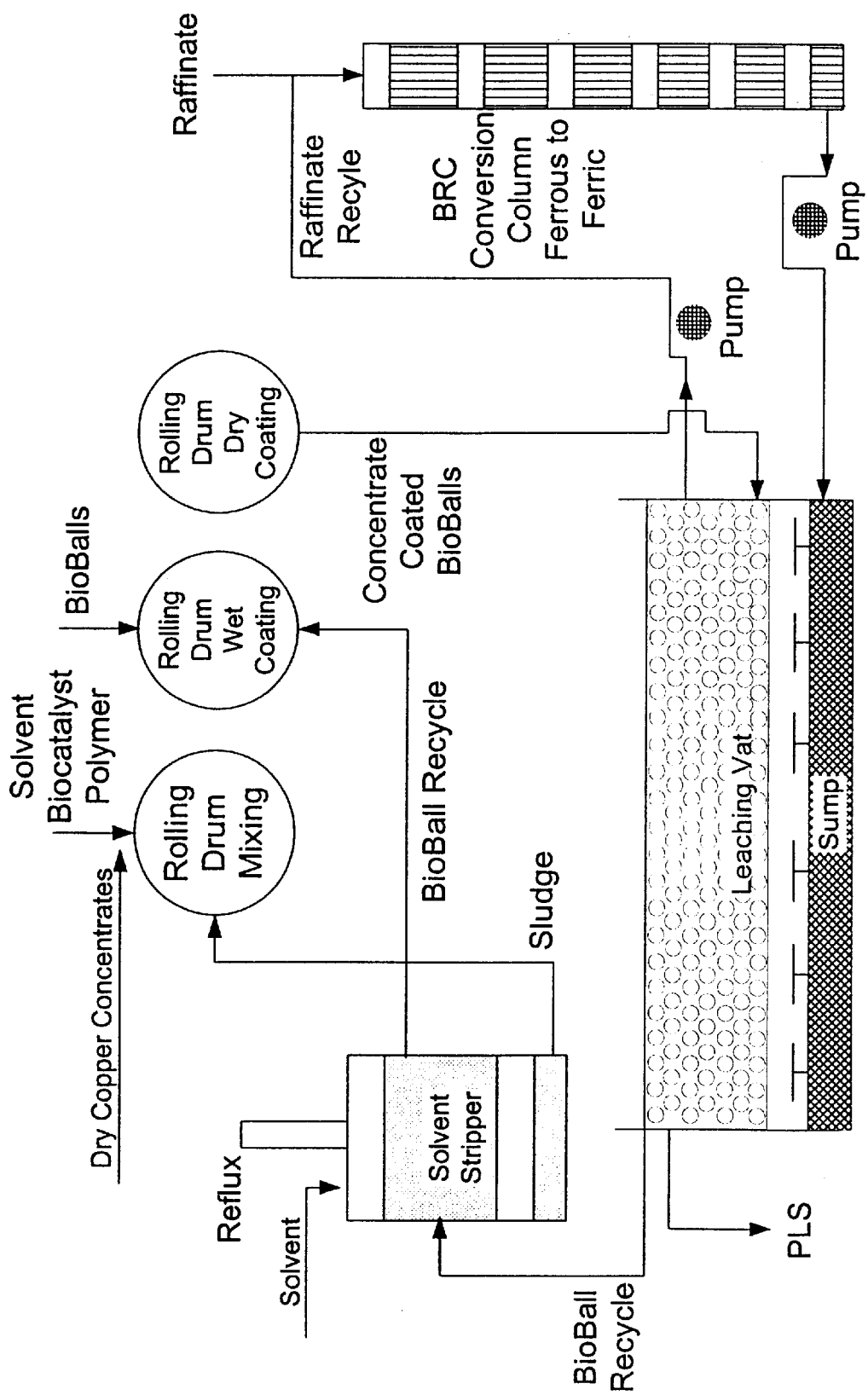
FIG. 1 is a schematic diagram of the metal-sulfide concentrate leaching process of the subject invention.

The subject invention relates to those manageable portions of bioleaching, chemical leaching, materials handling methods, and processing devices, which when combined effect efficient methods for the commercial solubilization of metals from sulfide mineral concentrates. The sulfide mineral concentrate source material is generally produced by conventional froth flotation concentration. The mineral composition of copper concentrates is generally a mixture of commercial metal sulfides combined with contaminate waste minerals such as pyrite and quartz, as well as by-product or co-product minerals such as silver, gold, and molybdenite. Concentrates of sufficient metal content are directly refined at primary smelters. Low-grade concentrates are either roasted and leached or mixed with high-grade concentrates to provide a commercial feed to a smelter. The waste products from processing of sulfide concentrates by smelting or roasting are undesirable and environmentally damaging. Waste products such as sulfur dioxide pollute air, arsenic and selenium residues pollute water, and leachates from slag piles pollute surface and ground water. Application of the methods, reagents, and devices which embody the subject invention can be used to commerciallyproduce metals in a more environmentallyresponsible manner.

In a preferred embodiment, the subject invention provides materials and methods which allow for the enhanced bioleaching of finely ground sulfide mineral concentrates or sulfur. The concentrates or sulfur can be attached to high surface area substrates, such as "BIOBALLS," using a polymerbinder formulation in a drum roll or other suitable operation. The coated and dried balls are placed in a vat, and leach solution is pumped throughout the bed until the desired metal solubilization recovery is obtained, or in the case where sulfur is being leached, until the desired sulfuric acid production is obtained.

The oxidation potential of the leach solution can be enhanced for metal sulfide leaching by recycling through a biological ferric generator. The biological ferric generator is also referred to as a biological raffinate converter, or simply BRC. Many sulfide minerals leach rapidly with high ferric solutions and the biological ferric generator is an economically efficient means of upgrading the ferric content of the reactant leach solutions.

In a specific embodiment of the subject invention, the reactor is a trickle bed type that uses a bed of catalyst/substrate-coated "BIOBALLS" that are inoculated with *Thiobacillus ferrooxidans* bacteria which attach to the substrate and convert ferrous to ferric in the process solution as part of their metabolism. Conversion rates of about 0.8 g/L/h are routinely obtained in a 20 gallon laboratory reactor at iron concentrations up to 50 g/L. Once the desired level of leaching has been obtained, the leached balls are sent to a stripper where the tails are separated from the "BIOBALLS" and polymer. The polymer and the balls are then recycled to the beginning of the circuit.

An additional aspect of the subject invention is an enhancement of blending a catalyst with the concentrates to enhance leach rate and recovery. A nutrient for iron oxidizing bacteria can also be incorporated. The combined catalyst and nutrient are referred to herein as "BIOCAT." In a preferred embodiment, the catalyst contains a small percentage of graphite powder, which provides a site for elemental sulfur to crystallize, a common reaction product in sulfide mineral leaching (U.S. Pat. No. 5,413,624). Further, the presence of graphite minimizes the blinding effects that can occur when the product sulfur forms an amorphous layer over the unleached sulfide minerals. The effect of graphite is to provide electrical conductance through the sulfur layer such that oxidation of the mineral can occur from oxidizing species in the process solution remotely. Graphite also provides a site for adsorption of oxygen in proximity to the mineral such that oxygen can oxidize subvalent cations ($Fe^{2+}$, for example) which subsequently oxidize the mineral. The nutrient medium provides a source of organic carbon and vitamins which support the growth and maintenance of oxidizingbacteriaused in the leaching process. In one embodiment, the nutrient medium is PEGM, as is described in U.S. Pat. No. 5,413,624.

A further aspect of the subject invention is the effective design of the reactors in which the concentrates are processed. Three basic reactor designs which can be utilized to bioleach sulfide mineral concentrates are exemplified herein. The reactor of choice is based on the following criteria:

1. Metal content of the concentrate measured in percent and subdivided for reference purposes as high or low grade.
2. Relative solubility of the concentrate in ferric sulfate, ferric chloride, or ferric sulfonate solutions.
3. Time requirements for commercial solubilization, i. e., higher treatment costs demand short retention times, lower treatment costs allow for longer retention times.

To accommodate the above-stated concentrate processing requirements, the following reactor designs are described:

1. A passive countercurrent vat bioleach (FIG. 3) with or without an ancillary biological ferric generator for ferric regeneration for low grade concentrates.
2. A passive segmented cell bioleaching column (FIG. 2) wherein application leach solutions are spray applied to cells loaded with sulfide concentrates loaded on "BIOBALLS."
3. A passive heap or open vat leach (FIG. 4) of stacked concentrate-loaded "BIOBALLS." Application leach solutions of ferric sulfate, or in the case of sulfidic gold and silver concentrates a cyanide leach solution. The integration of a biological ferric generator would be optional.

The subject invention pertains to the bioleaching of sulfide mineral concentrates, ores, residues, and/or elemental sulfur. One aspect of the invention pertains to advantageous methods for producing sulfuric acid from sulfur. When elemental sulfur is contacted with an inoculum containing *Thiobacillus thiooxidans*, Sulfolobus or other oxidizing bacterial species, or other acidophilic microbes such as fungi in the presence of air and water, the sulfur is oxidized by these microorganisms to sulfuric acid which is contained in the resulting aqueous solution. After an equilibrium is established and the pH of the solution is lowered to 1 or less, a side stream can be removed and used directly or sent to reverse osmosis membrane units to be upgraded to a higher concentration of acid. Fresh water can be added as makeup for the volume of solution removed as a side stream. The process may be operated at ambient temperatures or at elevated temperatures depending upon the microorganisms used.

Figure 6:
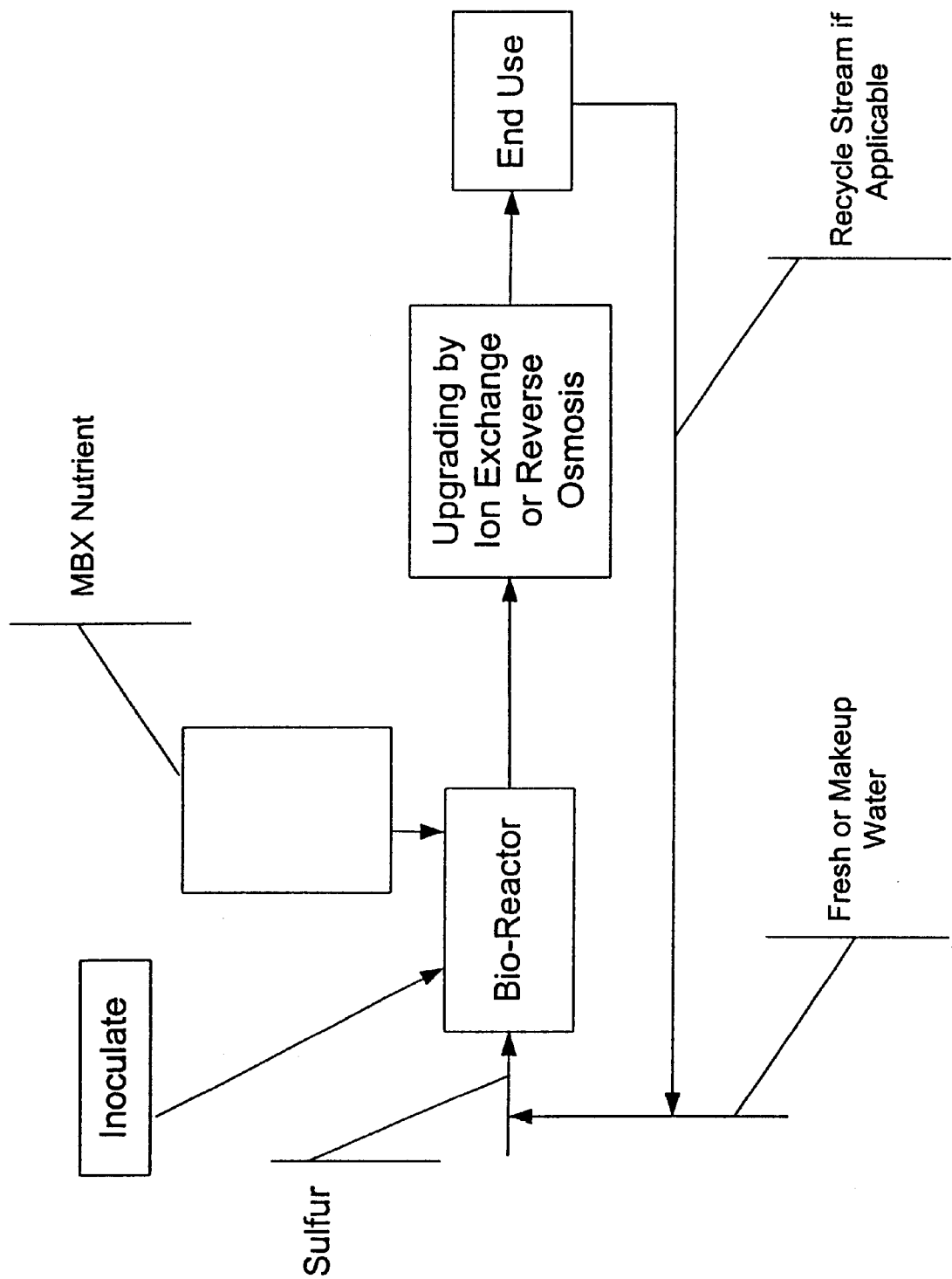
FIG. 6 is a general flow diagram for a biological method for producing sulfuric acid solutions from sulfur.

The sulfur may be coated onto "BIOBALLS" or may be used in granular form in columns or in heaps. The leaching of elemental sulfur to produce sulfuric acid is a non-polluting bio-process. It is applicable in all parts of the world with proper application and may be used with a minimal amount of equipment. FIG. 6 shows schematically one embodiment of this process. This process facilitates the production of sulfuric acid without the use of expensive capital equipment and, if properly used, creates no pollution. Conversely, current technology utilizing the burning of elemental sulfur and the processing of the resulting gases containing sulfur dioxide through catalyst beds creates air pollution and requires enormous capital expenditures. Therefore, the process of the subject invention provides low cost sulfuric acid for mines and plants located in remote areas and in countries lacking the infrastructure necessary to handle the extremely dangerous concentrated sulfuric acid. Most leaching operations use aqueous solutions of sulfuric acid that contain less than 20 grams per liter of sulfuric acid. With current technology, sulfuric acid is made in very concentrated form and then shipped to the point of use where it is diluted with water to produce the aqueous solutions used in most leaching operations. Use of the process of the subject invention permits generation of aqueous sulfuric acid solutions very near the point of use, eliminating the hazards to personnel and the environment that are associated with the current production of sulfuric acid. Pyrite may be substituted for elemental sulfur; however, an iron removal step may be required if upgrading of the acid is desired.

Experimental data demonstrate this process using *Thiobacillus thiooxidans*; however, any sulfur oxidizing acidophilic microorganisms may be used to produce sulfuric acid in the manner described herein. Sulfur may be present in any form that allows sufficient contact with oxygen and water.

The extraction of metals from sulfide concentrates or the production of sulfuric acid solution from elemental sulfur or pyrite is facilitated by the use of "BIOBALLS." However, said leaching of concentrates, ores, or residues occurs in the presence of carbon in solid form in agitated, stirred, or unstirred vats or tanks. The usage of the leached systems described herein are not limited to the use of columns of packed "BIOBALLS."

Materials and Methods

Chemical Leach:

Ferric sulfate. Chalcocite leach rate has long been known to increase in the presence of ferric ions. As the ferric ion oxidizes the copper, it becomes reduced to the ferrous ion. In the presence of oxygen and oxidizing bacteria such as *Thiobacillus ferrooxidans*, it is converted back to ferric. This reaction occurs naturally as long as oxygen and bacteria are present. This same natural process can be accelerated through the use of a biological ferric generator.

Catalysts. Catalysts are utilized in many industrial processes. For bioleaching the catalyst called "BIOCAT" has been developed. "BIOCAT" is a mixture of biological nutrients and finely ground graphite. The nutrient PEGM (U.S. Pat. No. 5,413,624) can be used to provide a source of organic carbon and vitamins which support the growth and maintenance of the oxidizing bacteria used in leaching. The graphite component of "BIOCAT" provides a site for elemental sulfur, a common reaction product in sulfide mineral leaching to crystallize (Wan et aL, supra). Further, the presence of the graphite minimizes the blinding effects that can occur when the product sulfur forms and amorphous layer over unleached sulfide minerals. The effect of the graphite is to provide a site of conductance between the sulfide mineral and oxygen, thus providing continuance of the bacterially catalyzed leach reaction.

Materials Handling:

"BIOBALLS" have a skeletal ring and pin configuration which serves as a surface upon which substrate and sulfide mineral concentrates can be attached. Polyethylmethacrylate (PEMA), paraffin, and other comparable formulations can be used to attach sulfide mineral substrate to support *T. ferrooxidans* or *T. thiooxidans* inoculum. Paraffin and "BIO- CAT" or concentrates have been coated onto "BIOBALLS" by dipping in molten paraffin and then dipping in "BIOCAT" or concentrates and cooling. PEMA and "BIOCAT" or concentrates have been coated onto "BIOBALLS" from solvent based slurries containing "BIOCAT" or concentrate and PEMA and drying. "BIOBALLS" can also be coated using crosslinkable aqueous polymer slurries such as furfural resins or PVA. Sulfur has been coated onto "BIOBALLS" by dipping "BIOBALLS" into the molten sulfur and then cooling. Utilizing the teachings provided herein, any binder system practiced in the art of coatings may be used.

Figure 3A:
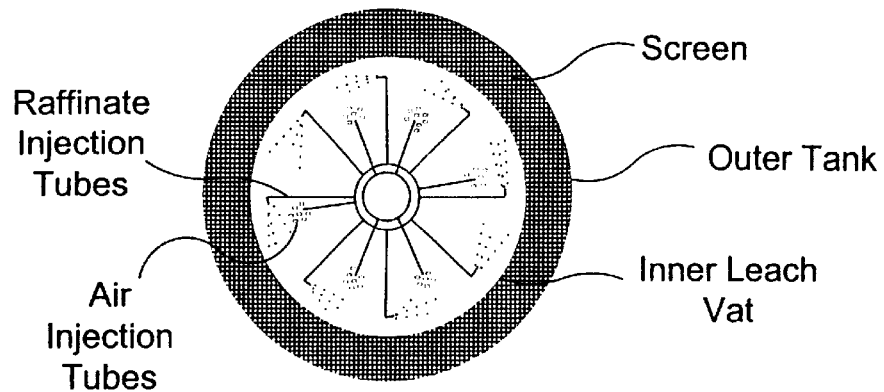
FIG. 3 diagrams a passive counter current vat bioleach system. "BIOBALLS" that are loaded with sulfide mineral concentrates have negative buoyancy, while "BIOBALLS" freed of their concentrate load float readily. Therefore, as the leach solutions solubilize the concentrate metals, the leached "BIOBALLS" can be decanted with the pregnant leach solution (PLS) and separated with a screen. The PLS is sent to an SX or IX plant for processing, and the "BIOBALLS" are recycled to the concentrate loading plant for recoating.
Figure 3B:
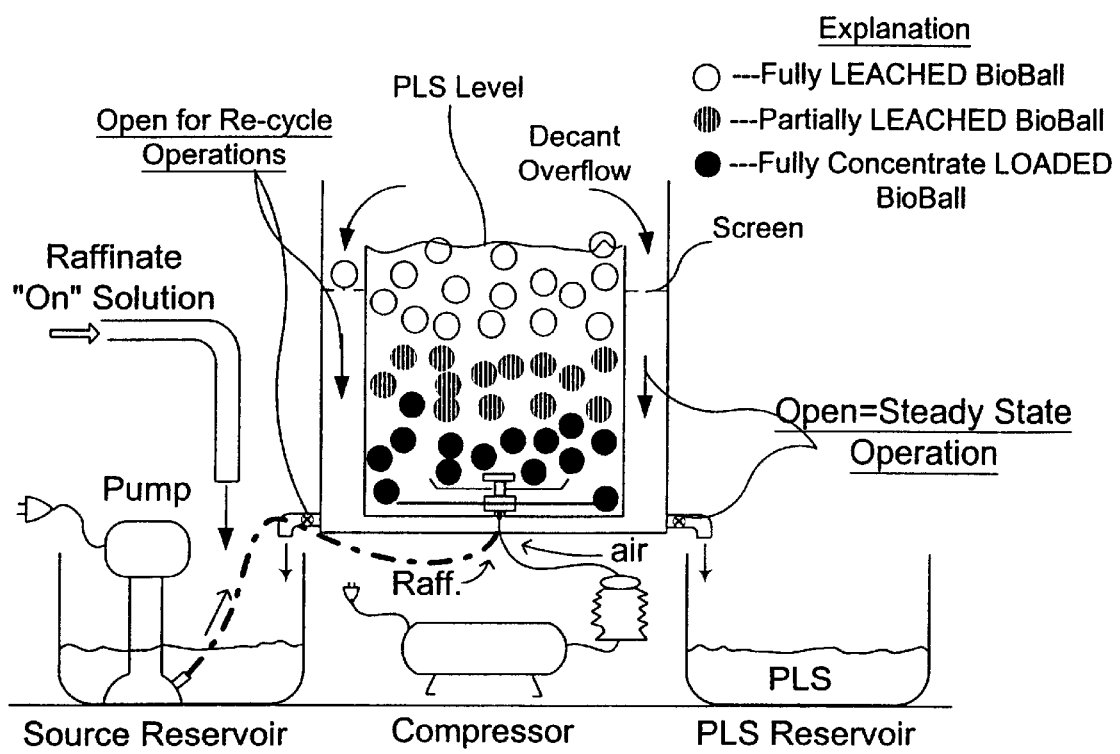
Figure 4A:
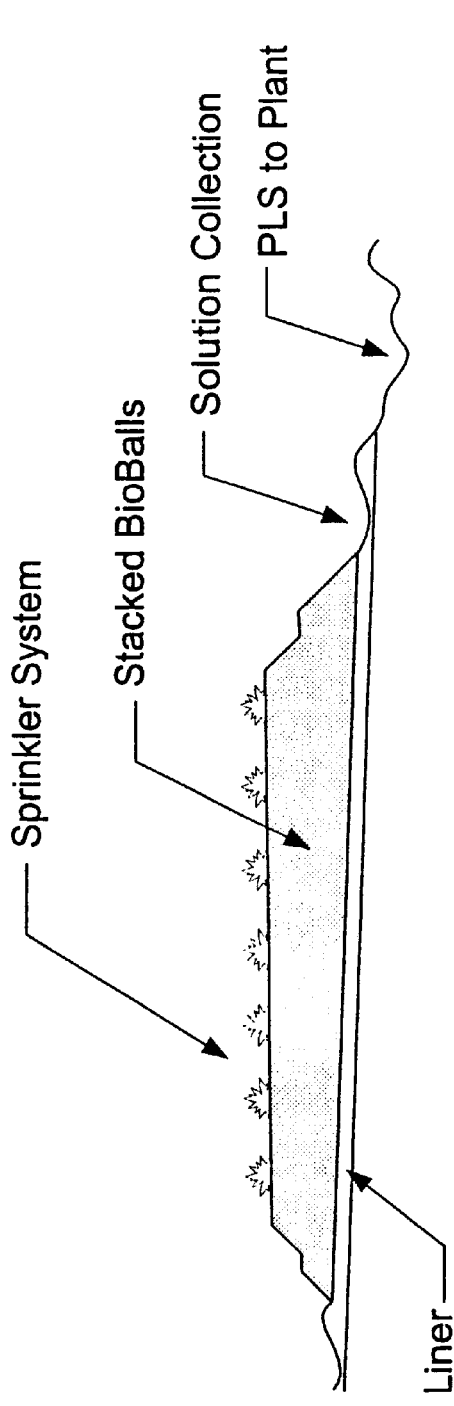
FIG. 4 is a diagram of "BIOBALL" concentrate heap leach and "BIOBALL" concentrate vat leach systems.
Figure 4B:
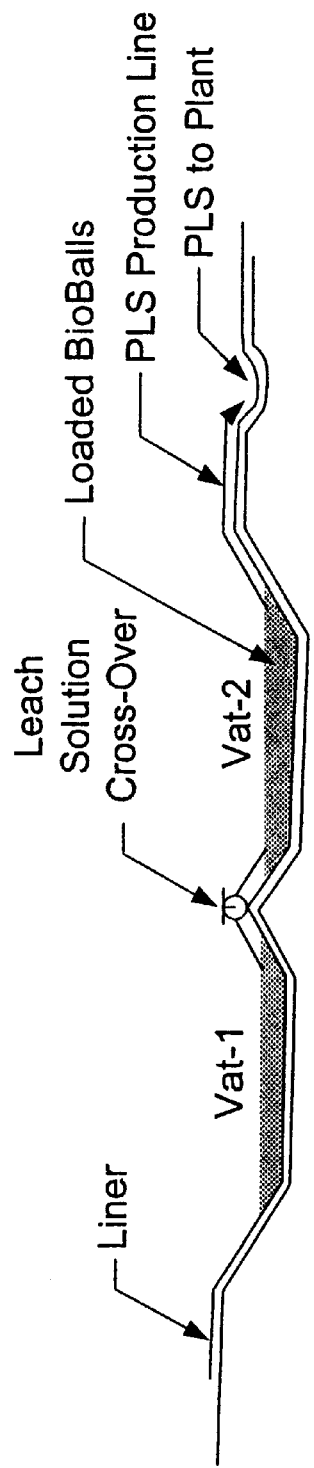

Unloaded, plain HDPE "BIOBALLS" float while loaded "BIOBALLS" do not. Because of this, sulfide mineral concentrate-loaded"BIOBALLS" can be passively leached. By loading coated "BIOBALLS" into the bottom of a countercurrent vat leach system, "BIOBALLS" float to the surface of the vat when the sulfide mineral concentration is leached (FIG. 3). Harvesting of the leached "BIOBALLS" which float to the surface can be accomplished by decantation of the leach liquor and screening of the "BIOBALLS." Recovered "BIOBALLS" can be recycled to coating drums, recoated with sulfide mineral concentrates, and reintroduced to the countercurrent vat leach system (FIG. 3).

Reactor Design:

Two sulfide mineral concentrate bioleaching reactors were designed and tested. The two designs provide different economics for extraction of different grades and types of sulfide mineral concentrates.

Figures 2A, 2B:
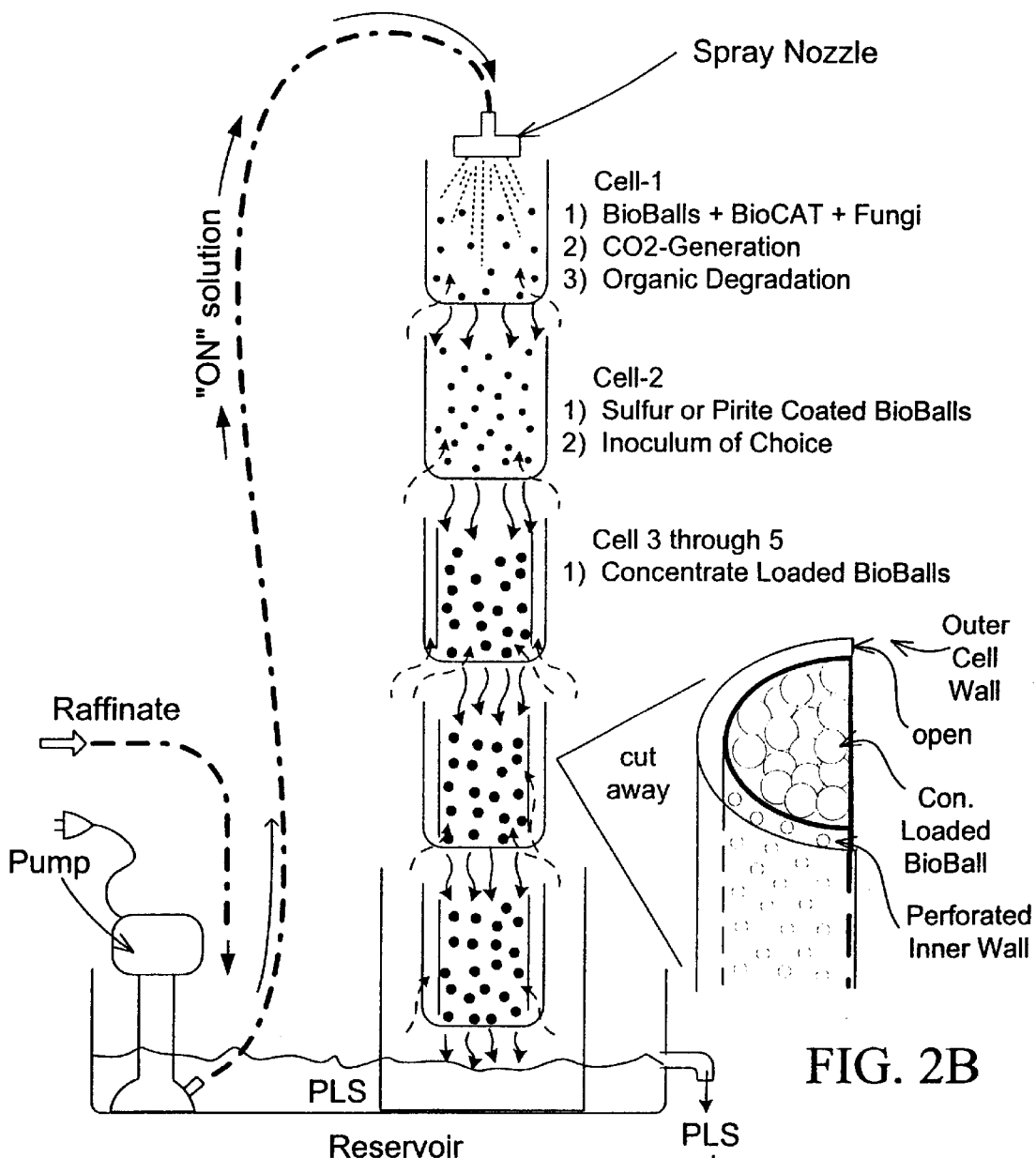
FIG. 2 is a diagram of a stacked-segmented cell bioleaching column. Leach solutions are pumped to the top of the column and sprayed in Cell 1. The "BIOCAT" plus fungi inoculum-charged "BIOBALLS" provide a site for carbon dioxide generation and for degradation of organic entrained in raffinate. As the solutions pass through Cell 1, they dissolve carbon dioxide through a naturally aerated space between cells to trickle onto Cell 2. Cell 2is charged with an inoculum-supporting substrate (sulfur for *T. thiooxidans* and pyrite for *T. ferrooxidans*) coated on the "BIOBALLS." As the leach solution passes through this Cell, ferrous ion is biooxidizedto ferric, and the solutions become charged with excess inoculum. The leach solutions then pass through Cells 3, 4, and 5, which are charged with concentrate-coated "BIOBALLS." Metal dissolution from the sulfide mineral concentrates generate a pregnant leach solution (PLS). The PLS is sent to an SX or IX plant for further processing.

The first design is a passive countercurrent flooded vat bioleaching system (FIG. 3). The countercurrent system is most useful for chemical leaching with sulfuric or MSA ferric solutions. The countercurrent system also allows extraction of acid leached "BIOBALLS," which float to the surface of the tank and decant with the PLS. A second design is a percolated stacked-segmented cell bioleaching column designed to process refractory sulfide mineral concentrates or to bioleach sulfur to produce sulfuric acid. The reactor design provides continuous inoculation and aeration of the concentrate loaded in "BIOBALL" cells (FIG. 2). The design anticipates that the sulfide mineral concentrates are of a grade that a medium- to long-term residence will not adversely affect economics. The reactor is passive air side, requiring only solution pumping, with no gas injection or moving parts.

A schematic diagram of a sulfuric acid production process is shown in FIG. 6. Sulfur and nutrient can be coated onto an appropriate substrate such as "BIOBALLS" and reacted with water in a bioreactor (shown in FIG. 2) and catalyzed with *Thiobacillus thiooxidans* inoculum. The reactor would produce a sulfuric acid solution of pH 2or less. If more concentrated acid is needed, ion exchange or reverse osmosis technology can be used.

Following is an example which illustrates a procedure for practicing the invention. This example should not be construed as limiting. All percentages are by weight and all solvent mixture proportions are by volume unless otherwise noted.

EXAMPLE 1

Leaching of Low-Grade Copper Concentrates Using "BIOBALLS"

Figure 5:
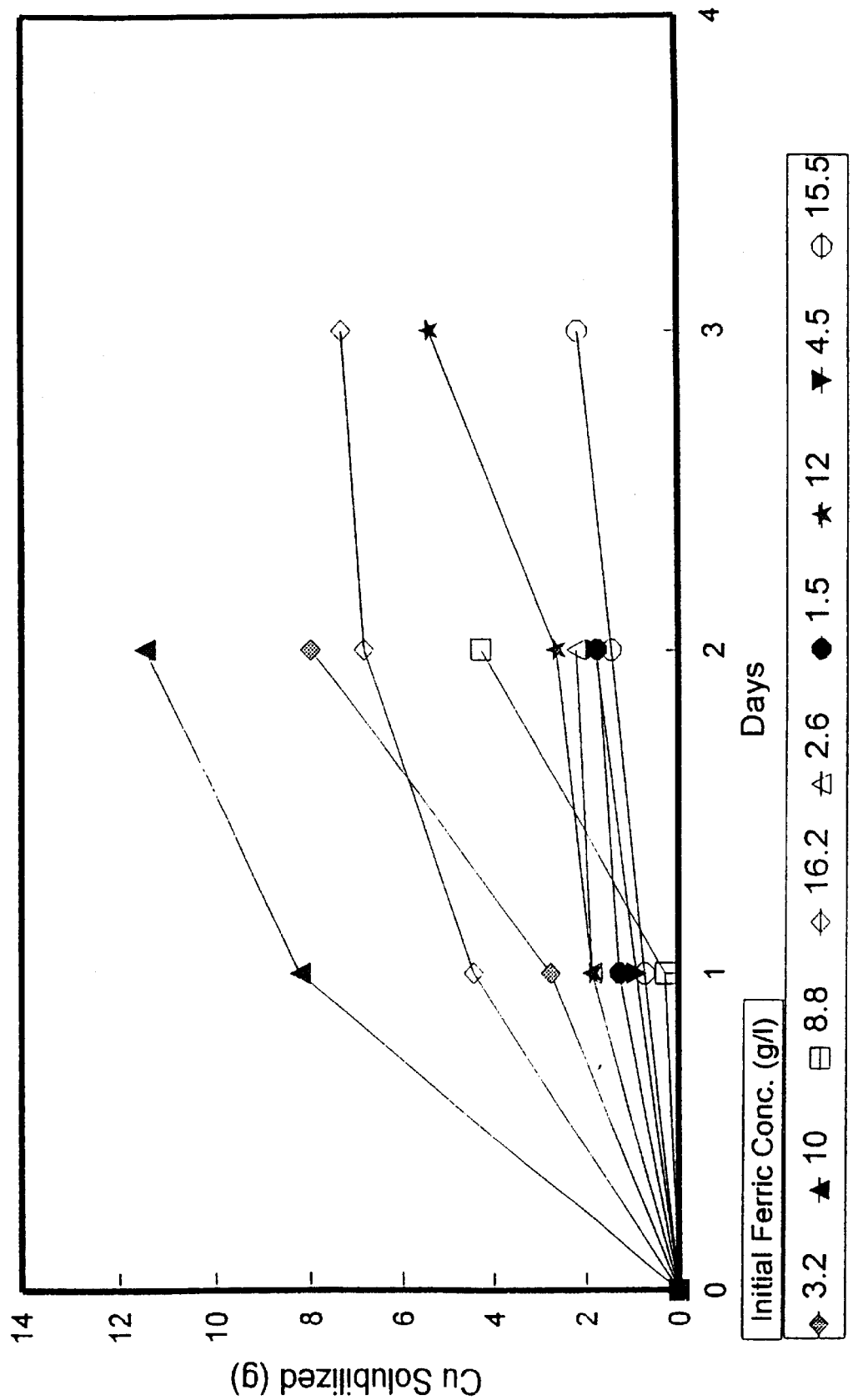
FIG. 5 illustrates how the initial ferric iron concentration was varied to determine its effect on the extraction rate from 0 g/L to as high as 15 g/L.

"BIOBALL" packing was used as a substrate for low-grade (considered too low-grade for direct smelting but contains significant metal value) copper concentrates from a mine in Arizona. Two tests were conducted in parallel. In one test, concentrates were used alone. In the other test, concentrates were combined with "BIOCAT." The low-grade copper concentrates were leached with biologically-generated high ferric lixiviant in shaken vats. The initial ferric iron concentration was varied to determine its effect on the extraction rate from 0 g/L to as high as 15 g/L (FIG. 5).

Copper concentrates were loaded onto "BIOBALLS" using the following procedure. Two batches of 250 g of dried concentrates were weighed. One batch was blended with a "BIOCAT" amendment of 5% by weight. Binder (medium molecular weight polyethylmethacrylamide)was added from a concentrated solution in acetone at 13 percent by volume of total solids. Additional acetone was added to reduce the viscosity of the slurry until pourable. One inch diameter "BIOBALLS" were then dipped into the slurry, rolled in a bed of dry concentrates, and dried. Twenty coated balls of each were prepared. Each batch of coated "BIOBALLS" was placed in a one-gallon polyethylene jar. 1200 ml of leach solution was added to each jar, which was sufficient to just cover the loaded "BIOBALLS." The leach solutions consisted of sulfuric acid at 10 g/L and additions of biologically generated ferric sulfate. The ferric content was varied in individual leach cycles to assess the effect of ferric concentration. Individual leach cycles were typically two days, but were increased in duration toward the end of the leach. The leach period was 30 days. The results of this experiment are summarized in Table 1. Ninety-three percent of the acid soluble copper was extracted without addition of "BIOCAT." Ninety-eight percent of the acid soluble copper was extracted with the addition of"BIOCAT."

TABLE 1

Ferric sulfate leach of chalcocite concentrates

| Day | Leach cycle | Copper (g/L) | T. ferrooxidans (g/L) | % extracted per leach | Cumulative % Cu extraction |
|---|---|---|---|---|---|
| Concentrates without catalyst ||||||
| 1 | 1 | 2.00 | 2.2 | | |
| 2 | | 5.40 | 3.0 | 8.00% | 8.00% |
| 3 | 2 | 8.50 | 10.0 | | 8.00% |
| 4 | | 8.50 | 9.5 | 12.50% | 20.50% |
| 5 | 3 | 6.00 | 8.8 | | 20.50% |
| 6 | | 6.80 | 9.2 | 16.00% | 36.50% |
| 7 | 4 | 6.50 | 15.9 | | 36.50% |
| 8 | | 8.60 | 16.8 | | 36.50% |
| 9 | | 9.30 | 15.5 | 16.50% | 53.00% |
| 10 | 5 | 2.00 | 2.9 | | 53.00% |
| 11 | | 2.20 | 2.9 | 3.90% | 56.90% |
| 12 | 6 | 1.17 | 1.5 | | 56.90% |
| 13 | | 1.65 | 1.5 | 2.90% | 59.80% |
| 14 | 7 | 2.80 | 9.6 | | 59.80% |
| 15 | | 4.00 | 8.9 | | 59.80% |
| 17 | | 7.40 | 11.3 | 13.10% | 72.90% |
| 19 | 8 | 2.80 | 4.3 | 5.00% | 77.90% |
| 21 | 9 | 3.40 | 14.7 | | 77.90% |
| 32 | | 8.90 | 15.3 | 15.70% | 93.60% |
| | | | | TOTAL: | 93.60% |
| Concentrates with biocatalyst ||||||
| 1 | 1 | 2.30 | 2.2 | | |
| 2 | | 5.70 | 3.2 | 12.10% | 12.10% |
| 3 | 2 | 7.50 | 9.6 | | 12.10% |
| 4 | | 8.60 | 10.0 | 18.30% | 30.40% |
| 5 | 3 | 3.40 | 5.9 | | 30.40% |
| 6 | | 5.90 | 8.8 | 20.10% | 50.50% |
| 7 | 4 | 3.70 | 16.1 | | 50.50% |
| 8 | | 5.70 | 16.8 | | 50.50% |
| 9 | | 6.10 | 16.2 | 15.60% | 66.10% |
| 10 | 5 | 1.56 | 2.5 | | 66.10% |
| 11 | | 1.84 | 2.6 | 4.70% | 70.80% |
| 12 | 6 | 1.07 | 1.4 | | 70.80% |

TABLE 1-continued

Ferric sulfate leach of chalcocite concentrates

| Day | Leach cycle | Copper (g/L) | T. ferrooxidans (g/L) | % extracted per leach | Cumulative % Cu extraction |
|---|---|---|---|---|---|
| 13 |   | 1.46 | 1.5  | 3.70%  | 74.50% |
| 14 | 7 | 1.56 | 9.5  |        | 74.50% |
| 15 |   | 2.20 | 9.6  |        | 74.50% |
| 17 |   | 4.50 | 12.0 | 11.50% | 86.00% |
| 19 | 8 | 1.50 | 4.5  | 3.80%  | 89.80% |
| 21 | 9 | 1.20 | 15.1 |        | 89.80% |
| 32 |   | 3.40 | 15.5 | 8.70%  | 98.50% |
|    |   |      |      | TOTAL: | 98.50% |

The results of the leach study verify the applicability of the subject invention for extraction of metals from concentrates and demonstrate the benefit of the additions of "BIO-CAT."

EXAMPLE 2

A column containing sulfur packed onto "BIOBALLS" was treated with an inoculum containing *Thiobacillus thiooxidans*. The initial aqueous solution used to start the inoculum had a pH of 6. Three days later, the pH of the solution had decreased to 1.73. These data demonstrate by the lowering of the pH that sulfuric acid is being generated by the *Thiobacillus thiooxidans*.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A biological reactor for enhanced concentrate leaching which comprises a plurality of bioreactor cells, in flow communication, said plurality of cells comprising:
   (a) a cell loaded with packing material which is coated with a substrate which supports and sustains the activity of acidophilic microbes;
   (b) a leaching cell loaded with packing material which is coated with an inoculum-supporting substrate which is leached;
   (c) a plurality of stacked cells loaded with packing material which supports a concentrate material, each one of the plurality of stacked cells comprising a perforated inner cell wall surrounded by an outer cell wall providing maximum air flow through the plurality of stacked cells; and
   wherein the plurality of bioreactor cells are constructed and arranged to provide air flow through the cells.

2. A biological reactor, according to claim 1, wherein said packing is a sphere.

3. A biological reactor, according to claim 1, wherein said packing is made from polyethylene.

4. A biological reactor, according to claim 1, wherein said concentrate comprises sulfide mineral concentrates.

5. A biological reactor, according to claim 4, wherein said concentrate further comprises blending graphite, or graphite and a nutrient, with said sulfide mineral concentrates.

6. A biological reactor, according to claim 1, wherein said concentrate or substrate is bonded to said packing with a polymer.

7. A biological reactor, according to claim 6, wherein said polymer is polyethyl methacrylate.

8. A biological reactor, according to claim 1, wherein said acidophilic microbes are selected from the group consisting of *Thiobacillus thiooxidans, Thiobaccilus ferrooxidans*, and fungi.

9. A biological reactor, according to claim 1, wherein said coated packing has differential density that allows siad coated packing to rise in the reactor or cell as said coated packing is leached away.

* * * * *

UNITED STATES PATENT AND TRADEMARK OFFICE
CERTIFICATE OF CORRECTION

PATENT NO. : 6,284,530 B1
DATED : September 4, 2001
INVENTOR(S) : James E. Sharp, Kevin L. Stuffle, Kelly L. Karlage, Tom L. Young It is certified that error appears in the above-identified patent and that said Letters Patent is hereby corrected as shown below:

Column 1,
Line 7, "091079,493" should read -- 09/079,493 --.
Line 22, "solubilizedmetal" should read -- solubilized metal --.
Line 23, "concentrationtechnology" should read -- concentration technology --.
Line 26, "electrowiming" should read -- electrowinning --.
Line 29, "*Thiobacillusferrooxidans*" should read -- *Thiobacillus ferrooxidans* --.

Column 2,
Line 11, "impenetrableto" should read -- impenetrable to --.

Column 3,
Line 17, "bioleachingcan" should read -- bioleaching can --.
Line 41, "Cell 2is" should read -- Cell 2 is --.
Line 45, "biooxidizedto" should read -- biooxidized to --.

Column 4,
Line 30, "polymerbinder" should read -- polymer binder --.

Column 5,
Line 7, "($Fe^2+$," should read -- ($Fe^{2+}$, --.
Line 10, "oxidizingbacteriaused" should read -- oxidizing bacteria used --.

Column 6,
Line 54, "et aL, supra)" should read -- *et al., supra*) --.

Column 7,
Line 51, "2or" should read -- 2 or --.

UNITED STATES PATENT AND TRADEMARK OFFICE
CERTIFICATE OF CORRECTION

PATENT NO. : 6,284,530 B1
DATED : September 4, 2001
INVENTOR(S) : James E. Sharp, Kevin L. Stuffle, Kelly L. Karlage, Tom L. Young It is certified that error appears in the above-identified patent and that said Letters Patent is hereby corrected as shown below:

<u>Column 10, claim 9,</u>
Line 36, "siad" should read -- said --.

Signed and Sealed this

Twelfth Day of March, 2002

*Attest:*

*Attesting Officer*

JAMES E. ROGAN
*Director of the United States Patent and Trademark Office*